United States Patent
Keller et al.

(10) Patent No.: US 9,421,590 B2
(45) Date of Patent: Aug. 23, 2016

(54) SEALING DEVICE AND ROLL ARRANGEMENT

(71) Applicant: SMS Siemag AG, Duesseldorf (DE)

(72) Inventors: Karl Keller, Hilchenbach (DE); Konrad Roeingh, Hilchenbach (DE); Daniel Knie, Freudenberg (DE)

(73) Assignee: SMS GROUP GMBH, Duesseldorf (DE)

( * ) Notice: Subject to any disclaimer, the term of this patent is extended or adjusted under 35 U.S.C. 154(b) by 81 days.

(21) Appl. No.: 14/378,364

(22) PCT Filed: Feb. 4, 2013

(86) PCT No.: PCT/EP2013/052110
§ 371 (c)(1),
(2) Date: Aug. 13, 2014

(87) PCT Pub. No.: WO2013/120713
PCT Pub. Date: Aug. 22, 2013

(65) Prior Publication Data
US 2016/0045944 A1    Feb. 18, 2016

(30) Foreign Application Priority Data

Feb. 15, 2012  (DE) .......................... 10 2012 202 285
Nov. 30, 2012  (DE) .......................... 10 2012 221 970

(51) Int. Cl.
*B21B 31/07*   (2006.01)
*B21B 13/00*   (2006.01)
*F16J 15/32*   (2016.01)

(52) U.S. Cl.
CPC ............... *B21B 13/00* (2013.01); *B21B 31/078* (2013.01); *F16J 15/3236* (2013.01)

(58) Field of Classification Search
CPC .. B21B 37/078; F16J 15/3204; F16J 15/3212; F16J 15/3232; F16J 15/3236
See application file for complete search history.

(56) References Cited

U.S. PATENT DOCUMENTS 2,231,947 A * 2/1941 Rich ............................ 277/402
3,545,774 A * 12/1970 Rickley ............... F16J 15/3236
                                                                277/564
(Continued)

FOREIGN PATENT DOCUMENTS

EP    297322    1/1989
EP    997673    5/2000
(Continued)

OTHER PUBLICATIONS

SMS Siemag Publication MORGOIL®—Roll Neck Bearing.

*Primary Examiner* — Debra Sullivan
(74) *Attorney, Agent, or Firm* — Abelman, Frayne & Schwab

(57) ABSTRACT

The invention relates to a sealing device for installation in a roll arrangement between the roll journals of a roll and chock. The sealing device has an annular main body having sealing rims that extend radially outwards. Furthermore, the sealing device has an annular reinforcement element having a strip-like section which coaxially surrounds the main body on the outer side thereof. In order to ensure the dimensional stability and thus also the function of the sealing device even after the installation thereof in the roll arrangement, that is to say after said sealing device has been pushed onto the frustroconical roll journals, the reinforcement element according to the invention has, in addition to the coaxial strip-like section, at least one flange which is connected thereto and is connected to the sealing rim. Furthermore, the invention relates to said roll arrangement.

6 Claims, 1 Drawing Sheet

(56) References Cited

U.S. PATENT DOCUMENTS

| | | |
|---|---|---|
| 4,866,827 A | 9/1989 | Benfer |
| 6,550,781 B1 | 4/2003 | Robotham |
| 7,467,796 B2 | 12/2008 | Tones |
| 7,900,933 B2 | 3/2011 | Tones |
| 8,342,753 B2 | 1/2013 | Osgood |
| 2002/0084594 A1* | 7/2002 | Drigani et al. ............... 277/559 |
| 2009/0166977 A1 | 7/2009 | Lutaud |
| 2010/0109253 A1 | 5/2010 | Keller |
| 2010/0254643 A1* | 10/2010 | Komori ........................ 384/480 |

FOREIGN PATENT DOCUMENTS

| | | |
|---|---|---|
| EP | 1447149 | 8/2004 |
| RU | 2051762 | 1/1996 |
| WO | 2008092616 | 8/2008 |

\* cited by examiner

SEALING DEVICE AND ROLL ARRANGEMENT

BACKGROUND OF THE INVENTION

1. Field of the Invention

The present invention relates to a sealing device to be inserted between a roll journal of a roll and a chock in which the roll is rotatably supported in a rolling mill stand. In addition, the invention relates to a roll arrangement with a roll and a chock in which the roll, together with the roll journal, is rotatably supported. The roll arrangement further includes the inventive sealing device that is supported between the truncated cone-shaped roll journal and a sealing ring of the chock.

2. Description of the Related Art

State-of-the art European Publications EP 1 625 897 B1 and EP 1 136 142 or International Patent Publication WO 2008/092616, basically disclose such sealing devices. Further, such sealing device and roll arrangement are disclosed in Information Publication "Morgoil, Roll Neck Bearings" of SMS Siemag Ag as shown in FIG. 2 of the instant application. FIG. 2 shows a classical roll arrangement with a roll 200 that essentially consists of a roll barrel 220 and at least one truncated cone-shaped roll journal 210 formed on the barrel. A pilot bush 310 is pushed onto roll journal without a possibility of rotation relative thereto. The roll journal, together with the pilot bush is rotatably supported in a bearing bush 330 connected with a chock 300 without a possibility of rotation relative thereto. Between the pilot bush 310 and the bearing bush 330, a lubrication film 325 is formed.

A sealing ring 320 is screwed on the barrel end side of the chock 300 as a cover.

There is further provided a sealing device 100 which is clamped, in radial direction, between the truncated cone-shaped roll journal 210 and the sealing ring and, in axial direction, between the barrel side end side 312 of the pilot bush 310 and the truncated cone-shaped journal 210 or a stop 340. The state-of-the art sealing device 100 has a ring-shaped, strip-shaped reinforcement element 130 that tightly surrounds a main body 110 of the sealing device on its outer side coaxially with respect to the longitudinal axis of the roll arrangement or the sealing device. The strip-shaped section 132 insures a high dimensional accuracy or shape stability, in particular against centrifugal forces.

During assembly of the roll arrangement, the pilot bush 310 is pushed onto the roll journal in the direction of the roll barrel 220. Simultaneously, the sealing device 100 becomes clamped in axial direction between the stop 340, the truncated cone-formed roll journal 210 and the barrel side end side 312 of the pilot bush 310. During this axial displacement, because of frictional behavior, there is a danger of the sealing device deformation and of a sealing rim "retraction." The sealing device and, in particular, the sealing lips would not be able to perform their function properly.

Proceeding from the state-of-the art, the object of the invention to so improve the sealing device and the roll arrangement that the shape of the sealing device remains stable during pushing of the pilot bush on the truncated cone-shaped roll journal.

SUMMARY OF THE INVENTION

The object of the invention is achieved with a sealing device is characterized in that the reinforcement element has, in addition to the coaxial strip-shaped section, a flange connected with the strip-shaped section and extending radially outwardly from the strip-shaped section, and also connected with the sealing rim.

The term "axial" means, within the bounds of the present description, "in direction of the longitudinal axis of the sealing device or parallel thereto. In the assembled condition, i.e., when the sealing device is mounted between the roll journal and the chock, the longitudinal axis of the sealing device coincides with the longitudinal axis of the roll. The terms "radial" and "coaxial" relate to the directions with respect to the above-mentioned longitudinal axis.

The inventive flange is connected with the coaxial strip-shaped, i.e., annular section of the reinforcement element so that it is resistant to bending to a most possible extent, so that during pushing of the sealing device on the roll journal, it resists to the generated coaxial forces. Due to its connection with the sealing rim, the flange insures a noticeably greater bending resistance of the sealing rim to the coaxial forces. In this way, it is insured that the sealing rim with the sealing lips formed thereon can perform its sealing function in the mounted condition after being pushed onto the roll journal, while insuring that the sealing lips contact the inner side of the sealing ring.

The reinforcement element, together with its coaxial strip-shaped section and the flange formed thereon, is formed, preferably, as one-piece member of fiber-reinforced plastic material. The advantage of using the fiber-reinforced plastic material consists in that the desired three-dimensional structure of the reinforcement element having a U-shaped cross-section can be easily produced, that the weight of the reinforcement element can be kept relatively small, and that, in particular, the necessary shape stability and stiffness can be achieved. Textile, aramide, carbon, or glass fiber are suitable as fiber material, preferably in form of a fabric. The strip-shaped section of the reinforcement element has, preferably, a reinforcement in form of a metal strip, in particular, steel strip, wherein the reinforcement, at least partially, is surrounded, by fiber-reinforced plastic material.

According to one embodiment of the invention, the main body has not only one, but two sealing rims provided on the main body which project radially outwardly from the main body, are arranged parallel to each other on the main body, and are spaced from each other in the axial direction. In this embodiment, the reinforcement element has, in addition to the coaxial strip-shaped section not one but two flanges connected with the strip-shaped section and extending radially outwardly form the strip-section which are arranged parallel to each other and are spaced from each other in the axial direction. The reinforcement element is advantageously located between the two sealing rims, and the two flanges of the reinforcement element are connected, respectively, with opposite end sides of the sealing rims. In this case, the two flanges insure the desirable shape stability, in particular, of both sealing rim against possible coaxial forces during mounting.

According to a further embodiment, the coaxial strip-shaped section of the reinforcement element is secured against the displacement relative to the main body with a safety element, preferably, in form of a pin. The danger of displacement of the reinforcement element relatively to the main body is particularly great during manufacturing of the sealing element when the sealing material is injection-molded in a shape for the sealing device. Then it is important that the pre-fabricated reinforcement element is secured in place so that in the hardened sealing device, it is located in the correct location.

The reinforcement element is preferably non-releasably connected with the sealing element. Thus, there is produced as integrated component of the sealing device, and it is preferably vulcanized in the sealing device or the main body.

According to a still further embodiment, the pilot bush end side of the main body of the sealing device widens, when seen in cross-section in its non-clamped condition, in form of a wedge, whereby the main body increasingly widens inwardly in the radial direction, i.e., in the direction toward the longitudinal axis of the sealing device. The wedge-shaped formation of the end side of the main body of the sealing device has an advantage consisting in that the force with which the sealing body is clamped in the axial direction between the stop, the truncated cone-shaped roll journal, and barrel side end surface of the pilot bush, is greater in the vicinity of the roll journal than further outwardly. This particular distribution of axial clamping forces in radial direction contributes to the shape stability of the sealing device in the mounted condition. In particular, the increased pressure force in the coaxial direction which results from the wedge-shaped formation of the end side of the main body, insures, in the vicinity of the roll journal, compensation of generated friction forces at those locations where the sealing device contacts the roll journal and, thus, contributes to the above-mentioned improved shape stability of the sealing device in the mounted condition.

The above-mentioned object of the invention is further achieved with a roll arrangement with the inventive sealing device. The advantages of this arrangement correspond to the advantages discussed above with reference to the sealing device.

According to the embodiment of the roll arrangement, the barrel side end side of the pilot bush is radially smooth. I.e., the end side forms a plane transverse to the longitudinal axis. This formation of the end side is important, in connection with wedge-shaped opposite end side of the main body of the sealing device, for achieving the desired radial distribution of the axial pressure forces. Naturally, the same radial distribution can be achieved by the wedge-shaped formation of the barrel side end side of the pilot bush and the radially smooth formation of the adjacent end side of the main body of the sealing device.

BRIEF DESCRIPTION OF THE DRAWINGS

The description is accompanied by two figures of the drawings. The drawings show.

DETAILED DESCRIPTION OF THE PREFERRED EMBODIMENT

Figure 1:
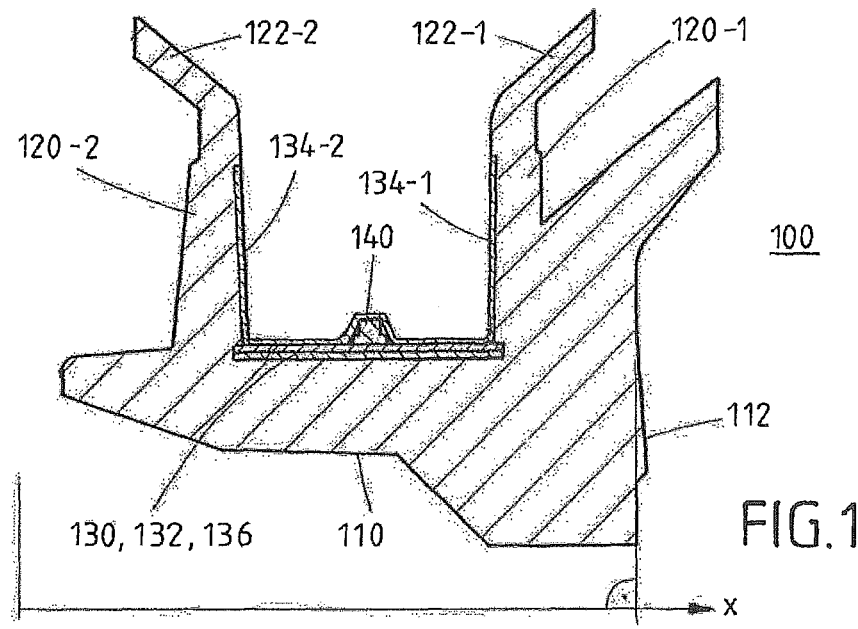
FIG. 1 a sealing device according to the invention.
Figure 2:
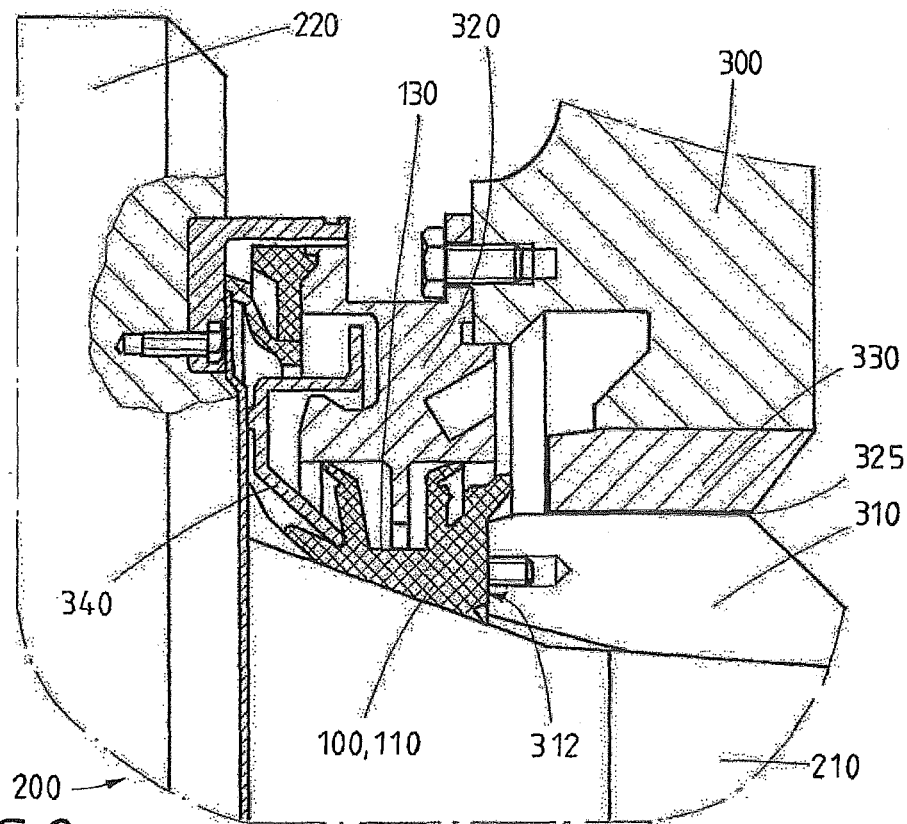
FIG. 2 a prior art roll arrangement with a sealing device.

The invention will be described in detail below with reference to an embodiment shown in FIG. 1. In FIGS. 1-2, the same technical elements are designated with the same reference numerals.

FIG. 1 shows the inventive sealing device 100. It essentially consists of an annular main body 110 provided with two sealing rims 120-1, 120-2 which extend radially outwardly. The sealing rims are provided each with a sealing lip 122-1, 122-2, respectively. The main body 110, together with sealing rims and sealing lips, is typically formed as a one-piece member from a suitable sealing material having a high wear resistance and a high aggressive media and aging resistance. In addition, the sealing device 100 has an annular reinforcement element 130 formed of a strip-shaped section 132 and two flanges 134-1, 134-2 which extend radially outwardly from the strip-shaped section. The reinforcement element is located between the two sealing rims, and the two flanges 134-1, 134-2 are connected, respectively, with opposite end surfaces of the sealing rims 120-1, 120-2. The reinforcement element is advantageously formed as one piece from a fiber-reinforced plastic material. The strip-shaped section 132 of the reinforcement element is typically formed with a reinforcement 136 in form of a metal strip surrounded, at least partially, by a fiber-reinforced plastic material. The reinforcement element is usually fixedly integrated in the sealing device, i.e., non-releasably connected therewith.

Advantageously, the reinforcement element 130 is vulcanized in the sealing device 100.

FIG. 1 further shows a safety element 140 that insures, during manufacturing of the sealing element, that the reinforcement element is not undesirably displaced relative to the main body or the sealing rims 120-1, 120-2.

Finally, FIG. 1 discloses that the pilot bush end side 112 of the main body 110 of the sealing device is formed as a wedge in cross-section. I.e., the end side becomes increasingly wider inwardly in radial direction, i.e., in direction of the longitudinal axis x of the sealing device.

The inventive sealing device 100 according to FIG. 1 is provided for use in the roll arrangement according to FIG. 2. The inventive sealing device is suitable for replacing the state-of-the art sealing device shown in FIG. 2. In particular, the sealing device 100, because of the provision, according to the invention, flanges of the reinforcement element and the wedge-shaped end side, is advantageously noticeably more stable than the known prior art sealing device.

LIST OF REFERENCE NUMERALS

100 Sealing device
110 Main body
112 Pilot bush end side of the main body
120-1 Sealing rim
120-2 Sealing rim
122-1 Sealing lip
122-2 Sealing lip
130 Reinforcement element
132 Strip-shaped section
134-1 Flange
134-2 Flange
136 Reinforcement
140 Safety element
200 Roll
210 Roll journal
220 Roll barrel
300 Chock
310 Pilot bush
312 barrel end side of the pilot bush
320 Seal
325 Lubrication film
330 Bearing bush
340 Stop
x axial direction, tantamount to longitudinal direction of the sealing device or the roll

The invention claimed is:
1. A sealing device (100) for mounting between a roll journal (210) of a roll (200) and a chock (300) in which the roll is rotatably supported in a rolling stand, the sealing device (100) comprising:
an annular main body (110) to be pushed on the roll journal (210);

at least one sealing rim (120-1) provided on the main body and extending radially outwardly and having a sealing lip (122-1);
and
an annular reinforcement element (130) having a strip-shaped section (132) coaxially encompassing the main body (110) on an outer side thereof,
characterized in that
the reinforcement element (130) has, in addition to the coaxial strip-shaped section (132), a flange (134-1) connected with the strip-shaped section and extending radially outwardly from the strip-shaped section, and also connected with the sealing rim (120-1), and
in that
a pilot bush end side (112) of the main body of the sealing device is formed as a wedge in cross-section in its non-clamped non-mounted condition, wherein the main body becomes increasingly wider inwardly in a radial direction on its end side when viewed in the direction toward the longitudinal axis (x).

2. A sealing device according to claim 1,
characterized in that
the reinforcement element (130) is formed as a one-piece member and the strip-shaped section is formed of a metal strip surrounded at least partially by a fiber-reinforced plastic material.

3. A sealing device according to one of claim 2,
characterized in that
the fibers of the fiber-reinforced plastic material are formed as aramide, carbon, or glass fibers.

4. A sealing device according to claim 3, wherein the fibers of the fiber-reinforced plastic material are in form of a fabric.

5. A sealing device (100) according to claim 1,
characterized in that
the at least one sealing rim comprises a first sealing rim on the main body (110), there is provided a second sealing rim (120-2) projecting radially outwardly from the main body (110) and which is arranged parallel to the at least one sealing rim and is spaced therefrom in an axial direction; and
that the reinforcement element (130) has, in addition to the coaxial strip-shaped section a second flange, (134-2) connected with the strip-shaped section and extending radially outwardly from the strip-section and which is arranged parallel to the first flange and is spaced therefrom in the axial direction (x),
wherein the reinforcement element (130) is located between the at least one sealing rim and the second sealing rim (120-1, 120-2), and the first and second flanges (134-1, 134-2) are connected with opposite end sides of the at least one and second sealing rims.

6. A roll arrangement, comprising:
a roll (200) having a roll barrel (220) and at least one roll journal (210) in form of a truncated cone provided on the roll barrel;
a pilot bush (310) pushable on the roll journal;
a chock (300) having a sealing ring (320) provided on a barrel side end side of the chock;
a bearing bush (330) supported in the chock without possibility of rotation relative thereto, wherein the at least one roll journal (210), together with the pilot bush (310) is rotatably supported in the bearing bush; and
a sealing device which has an annular main body (110) to be pushed on the roll journal (210);
at least one sealing rim (120-1) provided on the main body and extending radially outwardly and having a sealing lip (122-1);
and
an annular reinforcement element (130) having a strip-shaped section (132) coaxially encompassing the main body (110) on an outer side thereof,
characterized in that
the reinforcement element (130) has, in addition to the coaxial strip-shaped section (132), a flange (134-1) connected with the strip-shaped section and extending radially outwardly from the strip-shaped section and also connected with the sealing rim (120-1) and which is located, in the radial direction, between the formed as a truncated cone, roll journal (210) and the sealing ring (320) which is adjoined by at least one sealing lip (122-1, 122-2), and which is clamped, in the axial direction, between the roll journal (210) formed as a truncated cone and the pilot bush (310), and
a pilot bush end side (112) of the main body of the sealing device is formed as a wedge and (100) flatly adjoins, in the mounted and clamped condition, the opposite radial smooth end side (312) of the pilot bush (310).

\* \* \* \* \*